(12) United States Patent
Liu et al.

(10) Patent No.: US 11,781,062 B1
(45) Date of Patent: Oct. 10, 2023

(54) BIONICS-BASED EFFICIENTLY TRANSPORTED AND PACKED PROPPANT AND PREPARATION METHOD THEREOF

(71) Applicants: Southwest Petroleum University, Chengdu (CN); Tianjin Branch of CNOOC (China) Co., Ltd, Tianjin (CN)

(72) Inventors: Pingli Liu, Chengdu (CN); Jun Li, Chengdu (CN); Jian Yang, Chengdu (CN); Jianfa Wu, Chengdu (CN); Shang Gao, Chengdu (CN); Xingwu Guo, Chengdu (CN); Jian Zou, Chengdu (CN); Xitang Lan, Chengdu (CN); Liping Zhang, Chengdu (CN); Zhifeng Luo, Chengdu (CN); Lan Ren, Chengdu (CN); Changlong Liu, Chengdu (CN); Juan Du, Chengdu (CN); Xiang Chen, Chengdu (CN); Nianyin Li, Chengdu (CN); Peng Wang, Chengdu (CN)

(73) Assignee: Southwest Petroleum University, Chengdu (CN)

(*) Notice: Subject to any disclaimer, the term of this patent is extended or adjusted under 35 U.S.C. 154(b) by 0 days.

(21) Appl. No.: 17/844,731

(22) Filed: Jun. 21, 2022

(30) Foreign Application Priority Data

May 20, 2022 (CN) .......................... 202210558820.7

(51) Int. Cl.
*C09K 8/80* (2006.01)
*C09K 8/60* (2006.01)
*C09K 8/68* (2006.01)

(52) U.S. Cl.
CPC ................ *C09K 8/80* (2013.01); *C09K 8/605* (2013.01); *C09K 8/608* (2013.01); *C09K 8/68* (2013.01); *C09K 2208/08* (2013.01); *C09K 2208/10* (2013.01); *C09K 2208/28* (2013.01)

(58) Field of Classification Search
CPC .......... C09K 8/80; C09K 8/605; C09K 8/608; C09K 8/68; C09K 2208/08; C09K 2208/10; C09K 2208/28
See application file for complete search history.

(56) References Cited

U.S. PATENT DOCUMENTS

2015/0060072 A1* 3/2015 Busby ................... C09K 8/206
166/305.1

FOREIGN PATENT DOCUMENTS

| CN | 103602330 A | * | 2/2014 | ............. C09K 8/602 |
|---|---|---|---|---|
| CN | 104212436 A | * | 12/2014 | ............. C09K 8/605 |
| CN | 104694113 A | | 6/2015 | |
| CN | 105331352 A | | 2/2016 | |
| CN | 108676553 A | | 10/2018 | |
| CN | 113247564 A | | 8/2021 | |

\* cited by examiner

*Primary Examiner* — Kumar R Bhushan
(74) *Attorney, Agent, or Firm* — Nitin Kaushik (57) ABSTRACT

The present invention relates to a bionics-based efficiently transported and packed proppant and preparation method thereof, comprising enhanced fracturing fluid and biomimetic dandelion proppant; the mass ratio of the enhanced fracturing fluid and the biomimetic dandelion is: 1-2:100-400; the 100 pbw of enhanced fracturing fluid includes 0.1-1 pbw of drag reducing agent, 0.01-0.1 pbw of cleanup additive, 0.2-0.8 pbw of clay stabilizer, 0.01-0.05 pbw of bactericide, 0.01-0.2 pbw of nanoparticle enhancer, and water; the biomimetic dandelion proppant consists of modified proppant and modified fiber, and the mass ratio between the modified proppant and the modified fiber is 99-99.9:0.1-1.

10 Claims, 10 Drawing Sheets

BIONICS-BASED EFFICIENTLY TRANSPORTED AND PACKED PROPPANT AND PREPARATION METHOD THEREOF

CROSS-REFERENCE TO RELATED APPLICATIONS

The application claims priority to Chinese patent application No. 202210558820.7, filed on May 10, 2022, the entire contents of which are incorporated herein by reference.

TECHNICAL FIELD

The present invention pertains to the field of fracturing technology for oil and gas reservoir stimulation, specifically to a bionics-based efficiently transported and packed proppant and preparation method thereof.

BACKGROUND

With continuous development of oil and gas resources, the major trend of oil and gas development will lay in the exploitation of unconventional oil and gas resources and the enhancement of recovery efficiency of conventional oil and gas resources. However, fracturing is required in both the development of unconventional oil and gas resources and the enhancement of recovery efficiency of conventional oil and gas resources, it is a key step to carry the proppant into the fracturing fluid through fracturing, so the effect of packing proppant into the fracturing fracture will affect the fracturing effect.

At present, there are troubles in proppant packing in the fracturing process in many oilfields in China, mainly including: 1) The transport distance and packing height of proppant are limited, and the fractures at the far end cannot be supported, 2) the proppant is tightly packed in fractures and but the seepage channel of oil and gas in packed fractures is the small gap among the proppant, resulting in low seepage rate in packed fractures under high closing pressure, and 3) in existing fracturing technologies, the fracturing fluid is prepared with freshwater, with the main purpose of enhancing the efficiency of the fracturing fluid carrying the proppant into deep fractures and extending the proppant transport distance. In many oil and gas fields in China (offshore oil and gas wells, remote mountainous oil and gas wells, etc.), freshwater for fracturing needs to be transported to the construction site from far away to ensure the fracturing effect. However, water sources (seawater, high-salinity water, flowback fluid, etc.) closer to the fracturing site, are not used due to the poor proppant-carrying effect of the fracturing fluid prepared by them. Therefore, the long distance transport of fracturing water will further increase the cost of fracturing operations and consume a large amount of freshwater resources.

In response to the above problems, existing studies mainly focus on the following aspects. 1) Reducing the density of proppant and enhancing the suspending and transport performance of the proppant. Although this method can improve the proppant transport performance to a certain extent, the cost of low-density proppant is extremely high, which will increase the cost of fracturing operations. 2. Employing the channel fracturing technology to change the proppant packing mode to improve the conductivity of propped fractures. Although this method can enhance the conductivity of fracturing fractures, its construction requires long fiber injection, high-viscosity fracturing fluid and high-frequency pulse pumping. There will be many problems arising therefrom, for example, long fibers added will cause blockage in the fracturing process, high-viscosity fracturing fluid will bring about serious damage to the formation, especially in unconventional reservoirs, and high-frequency pulse pumping will complicate the fracturing process, thereby increasing the cost of fracturing. 3. Preparing the fracturing fluid with fracturing fluid, seawater and other water sources close to the fracturing site. Although this method can reduce the transport cost of fracturing water, the proppant-carrying effect of fracturing fluid prepared by it is not significantly improved.

Existing solutions such as CN102363727B, CN103275692B and CN105331352B all disclose a method of preparing fracturing fluid with seawater, which can directly use seawater to prepare fracturing fluid and solve the problem of water source for fracturing operations on offshore platform. However, the seawater-based fracturing only increases the viscosity, with no mention of the proppant-carrying effect, and fails to achieve efficient packing of the proppant in the fracturing fractures. CN110482754A discloses a treatment method and device for flowback fluid in shale gas fracturing. Firstly, the flowback fluid in shale gas fracturing is subject to settling, chemical precipitation and flocculation in turn to obtain flocs and primary clear solution. Then, the primary clear solution is filtered to remove the suspended solids and obtain the secondary clear solution, The secondary clear solution is treated with ion exchange to reduce its hardness, and then ultra-filtered to obtain the third clear solution. The third solution is subjected to reverse osmosis treatment to obtain the first target discharge solution and concentrated solution. The concentrated solution is evaporated to obtain the second target discharge solution. The treated flowback fluid cart meet the requirement of national first-class discharge standard, However, this technology has the disadvantages of long treatment time, slow reverse osmosis treatment speed, low efficiency, and high investment in materials arid equipment. As disclosed in CN109281645A, the self-suspending proppant is composed of aggregate and coating layer wrapped around the aggregate, the coating layer contains inner and outer membranes, the outer membrane is made from outer resin, outer catalyst, outer curing agent and amine compound, and the inner membrane is made from the first resin and the first curing agent or from the second resin, the second curing agent and the inner catalyst. This kind of self-suspending proppant is all suspended in clean water due to its surface coating, but the polymer on its surface will change the physical properties of the fracturing fluid, causing damage to the reservoirs, At the same time, the self-suspended proppant can only form settled proppant banks in the fracture, but cannot form high-conductivity channels. As disclosed in CN109372489A, the base fluid for channel fracturing and the fiber-proppant-carrying fluid are required to be prepared in the existing channel fracturing technology; the viscosity of the base fluid is 30 to 110 mPa·s, the viscosity of the fiber-proppant-carrying fluid is 50 to 200 mPa·s, the proppant ratio of the fiber-proppant-carrying fluid is 8% to 50% and the fiber ratio is 5% to 20%. In the prepad fluid stage, consistent with conventional fracturing, no fibers are added, and a large fracture is made by the channel fracturing in the formation and used as the main channel. The proppant plug is pumped at high-frequency pulse. The proppant slug containing fibers and proppant-free base fluid containing fibers are pumped alternatively in a pulsed manner. In this stage, the fracturing fluid with high viscosity carries the proppant into the fractures for proppant placement. In this process, the base fluid containing fibers is injected first, and then the proppant-carrying fluid containing fibers with high viscosity is injected, which is known as a cycle. In order to ensure long fractures packed with proppant significantly, 5 to 25 pumping cycles are required. However, with this technology, a large number of high-molecular polymers need to be added into the high-viscosity fracturing fluid to improve the viscosity, of fracturing fluid, resulting in an increase in the cost of fracturing fluid, and the polymers will cause damage to the reservoir; the pulse proppant-pumping process is complex and requires relevant equipment, which will bring about more construction coasts.

SUMMARY

The present invention provides a bionics-based efficiently transported and packed proppant and preparation method thereof in response to the problems of the prior art. The bionics-based proppant can be efficiently carried by fracturing fluid and packed into the fractures.

A bionics-based efficiently transported and packed proppant comprising enhanced fracturing fluid and biomimetic dandelion proppant, wherein the mass ratio of the enhanced fracturing fluid and the biomimetic dandelion is: 1-2:100-400;

The 100 pbw of enhanced fracturing fluid includes 0.1-1 pbw of drag reducing agent, 0.01-0.1 pbw of cleanup additive, 0.2-0.8 pbw of clay stabilizer, 0.01-0.05 pbw of bactericide, 0.01-0.2 pbw of nanoparticle enhancer, and water;

The biomimetic dandelion proppant consists of modified proppant and modified fiber, and the mass ratio between the modified proppant and the modified fiber is 99-999:0.1-1.

Further, the nanoparticle enhancer is nanoparticle, which is modified as follows:

The modifier is sprayed on the surface of the nanoparticle, and then nanoparticle are kept at 50° C. for 20-30 min and dried at 105° C. to obtain the modified nanoparticle:

The nanoparticle are prepared with one, two or more of nanosilicon dioxide, nanometer titania and nano zirconia in any proportion.

Further, the modifier is prepared with one, two or more of cocamidopropyl hydroxysulfobetaine, lauramidopropyl betaine, dodecyl polyglucoside and sodium alpha-olefin sulfonate in any proportion.

Further, the proppant is modified as follows:

Step 1-1: Clean the proppant, dry it at 105° C., and then cool down to room temperature;

Step 1-2: Sock the proppant prepared in Step 1-1 in a proppant treating agent at 50° C. for 10-30 min;

Step 1-3: Filter out the proppant, dry it at 50° C., heat it up to 105° C. for 10-30 min to obtain the desired modified proppant.

Further, the fibers are modified as follows;

Step 2-1: Clean the fibers and dry, them at 105° C.;

Step 2-2: Put the fibers prepared in Step 2-1 in an acidic solution with a temperature of 40-90° C., and soak and ultrasonically oscillate it for 30-40 min;

Step 2-3: Filter out the fibers and dry them at 105° C.;

Step 2-4: Soak the dried fibers in a solution of nitrogen-containing silane coupling agent for 5-10 min, filter them out and dry in the shade at 70-80° C. to obtain the desired modified fibers.

Further, the proppant treating agent includes 70 pbw of organic solvent, 1-5 pbw of poly-methyltriethoxysilane, 1-20 pbw of silane coupling agent, 0.1-3 pbw of titanate, and 0.5 to 2 pbw of silicone resin.

Further, the: drag reducing agent is polyacrylamide polymer; the clay stabilizer is prepared with one, two or more of potassium chloride, ammonium chloride and dodecyl trimethyl ammonium chloride in any proportion; the cleanup additive is one of alkyl glycoside nonionic surfactant and nonionic surfactant; the bactericide is dodecyl dimethyl benzyl ammonium chloride; the water is prepared with one, two or more of seawater, freshwater, flowback liquid and high-salinity water, or no water is contained.

Further, the proppant is prepared with one, two or more of quartz sand, ceramsite and steel slag in any proportion, with a particle size of 20-140 mesh; the organic solvent is prepared with one, two or more of alcohol, ethanol, isopropyl alcohol, tert butyl alcohol, normal butanol, water, glacial acetic acid, ethyl acetate, benzene, toluene and xylene in any proportion; the silane coupling agent is prepared with one, two or more of N-(B-aminoethyl)-γ-aminopropytrimethoxysilane, N-(β-aminoethyl)-γ-aminopropyltriethoxysilane, 3-(methacryloyloxy)propyltrimethoxysilane, N-aminoethyl-3-aminopropylmethyldimethoxysilane and bis(3-trimethoxysilylpropyl)amine in any proportion; the titanate is prepared with one, two or more of titanium tetrabutoxide, tetraisopropyl titanate and tetraethyl titanate in any proportion.

Further, the fibers are prepared with one, two or more of mineral fiber, polyester fiber, polyamide fiber, polyvinyl alcohol fiber, polyacrylonitrile fiber, polypropylene fiber, polyvinyl chloride fiber, viscose fiber, acetate fiber, cupro fiber, cellulose fiber and basalt fiber in any proportion, with a length of 1-20 mm; the acid solution is prepared with one, two or more of diluted hydrochloric acid, diluted sulfuric acid, acetic acid, formic acid, propionic acid, chromic acid, organic sulfonic acid, organic boric acid and organic phosphoric acid in any proportion; the silane coupling agent is prepared with one, two or more of N-(B-aminoethyl)-γ-aminopropytrimethoxysilane, N-(β-aminoethyl)-γ-aminopropytrimethoxysilane, 3-(methacryloyloxy)propyltrimethoxysilane, N-aminoethyl-3-aminopropylmethyldimethoxysilane and bis(3-trimethoxysilylpropyl)amine in any proportion.

The preparation method for a bionics-based efficiently transported and packed proppant is to completely mix the enhanced fracturing fluid and the biomimetic dandelion proppant in proportion to their weight to obtain the desired proppant.

The present invention has the following beneficial effects:

(1) With the present invention, local water sources can be effectively used for fracturing fluid preparation and the prepared fracturing fluid can efficiently carry and displace the proppant, greatly reducing the cost of fracturing operations, shortening the fracturing period and enabling the continuous operation of offshore fracturing, which is conducive to expanding the scale of fracturing projects;

(2) The biomimetic proppant of the present invention can be efficiently, transported into the formation, with transport distance significantly increased; the modified proppant and the modified fiber can be grafted with each other to create settled proppant bank with high-seepage channels.

DETAILED DESCRIPTION OF THE EMBODIMENTS

The present invention is further described with reference to the drawings and embodiments.

A bionics-based efficiently transported and packed proppant comprising enhanced fracturing fluid and biomimetic dandelion proppant, wherein the mass ratio of the enhanced fracturing fluid and the biomimetic dandelion is: 1-2:100-400;

The 100 pbw of enhanced fracturing fluid includes 0.1-1 pbw of drag reducing agent, 0.01-0.1 pbw of cleanup additive, 0.2-0.8 pbw of clay stabilizer, 0.01-0.05 pbw of bactericide, 0.01-0.2 pbw of nanoparticle enhancer, and water; the nanoparticle enhancer is nanoparticle, which is modified as follows:

The modifier is sprayed on the surface of the nanoparticle, and then nanoparticle are kept at 50° C. for 20-30 min and dried at 105° C. to obtain the modified nanoparticle;

The nanoparticle are prepared with one, two or more of nanosilicon dioxide, nanometer titania and nano zirconia in any proportion. the modifier is prepared with one, two or more of cocamidopropyl hydroxysulfobetaine, lauramidopropyl betaine, dodecyl polyglucoside and sodium alpha-olefin sulfonate in any proportion.

The drag reducing agent is polyacrylamide polymer; the day stabilizer is prepared with one, two or more of potassium chloride, ammonium chloride and dodecyl trimethyl ammonium chloride in any proportion; the cleanup additive is one of alkyl glycoside nonionic surfactant and nonionic surfactant; the bactericide is dodecyl dimethyl benzyl ammonium chloride; the water is prepared with one, two or more of seawater, freshwater, flowback liquid and high-salinity water, or no water is contained, The biomimetic dandelion proppant consists of modified proppant and modified fiber, and the mass ratio between the modified proppant and the modified fiber is 99-99.9:0.1-1.

The proppant is modified as follows:

Step 1-1; Clean the proppant, dry it at 105° C., and then cool down to room temperature;

Step 1-2: Sock the proppant prepared in Step 1-1 in a proppant treating agent at 50° C. for 10-30 min;

Step 1-3: Filter out the proppant, dry it at 50° C. heat it up to 105° C. for 10-30 min to obtain the desired modified proppant.

The proppant treating agent includes 70 pbw of organic solvent, 1-5 pbw of poly-methyltriethoxysilane, 1-20 pbw of silane coupling agent, 0.1-3 pbw of titanate, and 0.5 to 2 pbw of silicone resin.

The proppant is prepared with one, two or more of quartz sand, ceramsite and steel slag in any proportion, with a particle size of 20-140 mesh; the organic solvent is prepared with one, two or more of alcohol, ethanol, isopropyl alcohol, tart butyl alcohol, normal butanol, water, glacial acetic acid, ethyl acetate, benzene, toluene and xylene in any proportion; the silane coupling agent is prepared with one, two or more of N-(B-aminoethyl)-γ-aminopropytrimethoxysilane, N-(β-aminoethyl)-γ-aminopropytriethoxysilane, 3-(methacryloyloxy)propyltrimethoxysiane, N-aminoethyl-3-aminopropyl-methyldimethoxysilane and bis(3-trimethoxysilylpropyl) amine in any proportion; the titanate is prepared with one, two or more of titanium tetrabutoxide, tetraisopropyl titanate and tetraethyl titanate in any proportion.

The fibers are modified as follows:

Step 2-1: Clean the fibers and dry them at 105° C.;

Step 2-2: Put the fibers prepared in Step 2-1 in an acidic solution with a temperature of 40-90° C., and soak and ultrasonically oscillate it for 30-40 min;

Step 2-3: Filter out the fibers and dry them at 105° C.;

Step 2-4: Soak the dried fibers in a solution of nitrogen-containing silane coupling agent for 5-10 min, filter them out and dry in the shade at 70-80° C. to obtain the desired modified fibers.

The fibers are prepared with one, two or more of mineral fiber, polyester fiber, polyamide fiber, polyvinyl alcohol fiber, polyacrylonitrile polypropylene fiber, polyvinyl chloride fiber, viscose fiber, acetate fiber, cupro fiber, cellulose fiber and basalt fiber in any proportion, with a length of 1-20 mm; the acid solution is prepared with one, two or more of diluted hydrochloric acid, diluted sulfuric acid, acetic acid, formic acid, propionic acid, chromic acid, organic sulfonic acid, organic boric acid and organic phosphoric acid in any proportion: the silane coupling agent is prepared with one, two or more of N-(B-aminoethyl)-γ-aminopropytrimethoxysilane, N-(β-aminoethyl)-γ-aminopropytriethoxysilane, 3-(methacryloyloxy)propyltrimethoxysilane, N-aminoethyl-3-aminopropylmethyldimethoxysilane and bis(3-trimethoxysilylpropyl)amine in any proportion.

The desired proppant can be obtained by completely mixing the enhanced fracturing fluid and the biomimetic: dandelion proppant in proportion to their weight.

Embodiment 1

A bionics-based efficiently transported and packed proppant comprising enhanced fracturing fluid and biomimetic dandelion proppant, wherein the mass ratio of the enhanced fracturing fluid and the biomimetic dandelion is: 1-2:100-400;

The enhanced fracturing fluid is seawater-based fracturing fluid, and 100 pbw of seawater-based fracturing fluid includes 0.1 pbw of polyacrylamide polymer, 0.01 pbw of alkyl glycoside nonionic surfactant, 0.2 pbw of ammonium chloride, 0.01 pbw of dodecyl dimethyl benzyl ammonium chloride, 0.05 pbw of nanosilicon dioxide, and artificial seawater. The nanoparticle enhancer is nanoparticle, which is modified as follows.

The cocamidopropyl hydroxysulfobetaine solution is sprayed on the surface of the nanoparticle, and then the nanoparticle are placed at a constant temperature of 50° C. for 20 min, and then dried at 105° C. to obtain the nanoparticle enhancer.

The treated nanoparticle are added to the enhanced fracturing fluid and anionic polymers are grafted on the fracturing fluid surface to dissociate negatively charged groups during fracturing, making the entire fracturing fluid system frill of free negative charges. The fracturing systems respectively with and without modified nanoparticle are tested by a Zeta potential meter. The results are shown in Table 1. From the table, it can be seen that Zeta potential in the enhanced fracturing fluid system is significantly greater than that in the conventional fracturing fluid system, which indicates that the fracturing fluid system with biomimetic proppant has negative charges.

TABLE 1

Comparison of Zeta Potential between Enhanced Fracturing Fluid System and Conventional Fracturing Fluid System

| SD/N | 1114-5 | 1114-11 |
|---|---|---|
| Description | Conventional fracturing fluid system | Fracturing fluid system with biomimetic proppant |
| Zeta potential coefficient | −10.39 | −18.54 |

The biomimetic dandelion proppant consists of modified proppant and modified fiber, and the mass ratio between the modified proppant and the modified fiber is 99-99.9:0.1-1.

The modified proppant is treated ceramsite with a particle size of 20-40 mesh, consisting of 70 pbw of tert butanol, 1 pbw of poly-methyltriethoxysilane, 10 pbw of 3-(methacryloyloxy) propyl trimethoxysilane, 0.5 pbw of titanate coupling agent and 1 pbw of silicone resin.

The proppant is modified as follows.

Step 1-1: Clean the proppant to remove surface impurities usually with deionized water, dry it at 105° C., and cool down to room temperature;

Step 1-2: Soak the proppant prepared in Step 1-1 in a proppant treating agent at 50° C. for 30 min;

Step 1-3: Filter out the proppant, dry it at 50° C. and beat it up to 105° C. for 30 min to obtain the desired modified proppant. After the above treatment, the interaction between the proppant and the fibers is improved.

The fibers are modified fibers which are treated with polyvinyl alcohol, with a length of 9 mm, The fibers are modified as follows.

Step 2-1: Put the fibers into a plasma cleaning agent for 5 to 10 min, and dry them at 105° C.;

Step 2-2: Put the fibers prepared in Step 2-1 in a chromic add solution with a temperature of 40-90° C., and soak and ultrasonically oscillate it for 30-40 min;

Step 2-3: Filter out the fibers and dry them at 105° C.;

Step 2-4: Soak the dried fibers in an ethanol solution containing N-aminoethyl-(dimethoxyimethylsilyl) propylamine for 10 min, filter them out and dry in the shade at 70° C. to obtain the desired modified fibers, Then, completely mix the enhanced fracturing fluid and the biomimetic dandelion proppant in proportion to their weight to obtain the desired proppant.

Figure 7:
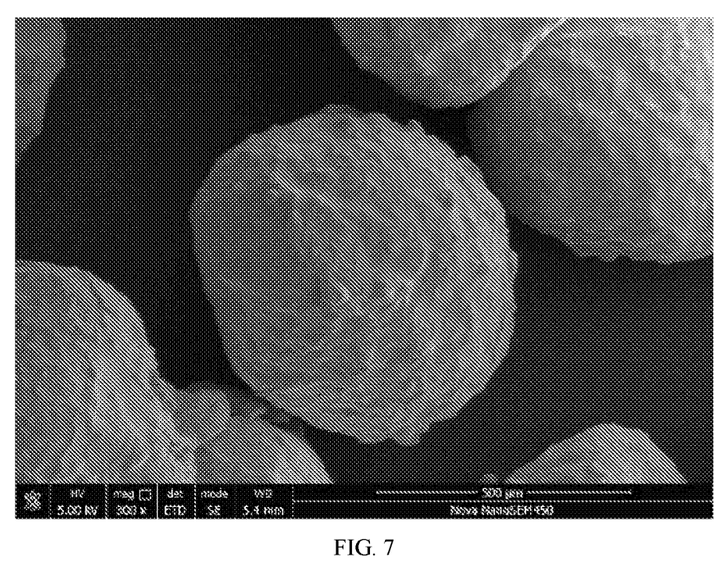
FIG. 7 is a SEM image of the modified proppant obtained in Embodiment 1 of the present invention.
Figure 8:
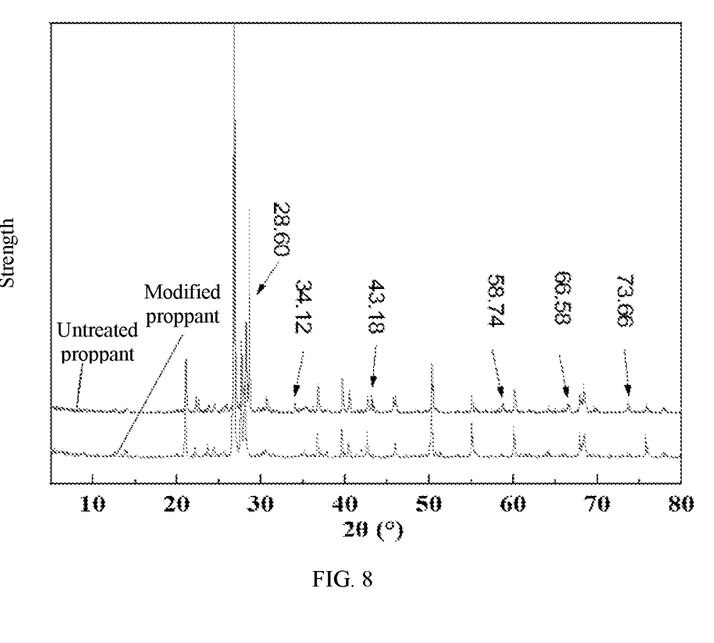
FIG. 8 is a schematic XRD pattern of the modified proppant and the untreated proppant obtained in Embodiment 1 of the present invention.

The SEM image of the modified proppant obtained in this embodiment is shown in FIG. 7, from which it can be seen that the surface of the proppant after surface treatment is obviously gelatinized, indication that the treated proppant is covered with a layer of membrane that changes the surface properties of the proppant. The XRD pattern of the modified proppant obtained in this embodiment and the XRD pattern of the untreated proppant are shown in FIG. 8. As can be seen from the diagram, the peaks at 28.60°, 34.12°, 43.18°, 58.74°, 66.58° and 73.66° in the untreated proppant are significantly weaker or disappear compared to the treated proppant, indicating that the polymer is successfully coated on the surface of the proppant.

Figure 9:
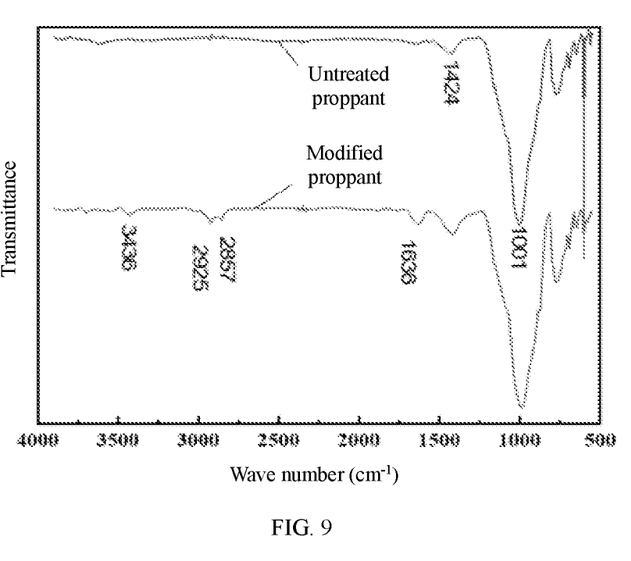
FIG. 9 is a schematic diagram of the ATR-FTIR comparison between the modified proppant obtained in Embodiment 1 of the present invention and the untreated proppant.

The diagram of ATR-FTIR comparison between the modified proppant Obtained in this embodiment and the untreated proppant is shown in FIG. 9. The figure shows that the conventional proppant has a stretching vibration absorption peak for the Si-O bond at 1,001 $cm^{-1}$ and a stretching vibration absorption peak for the water molecules adsorbed on the proppant surface at 1,424 $cm^{-1}$ The modified proppant has significantly more peaks at 3,436 $cm^{-1}$, 2,925 $cm^{-1}$, 2,857 $cm^{-1}$ and 1,636 $cm^{-1}$ than the untreated proppant, with the peak at 3,436 $cm^{-1}$ attributed to a stretching vibration absorption peak of the zwitterionic polymer, the peaks at 2925 $cm^{-1}$ and 2857 $cm^{-1}$ attributed to another stretching vibration absorption peak of the zwitterionic polymer and the peak at 1,636 $cm^{-1}$ attributed to the C=O stretching vibration absorption peak of the zwitterionic polymer. This Shows that the zwitterionic polymer is successfully coated on the surface of the proppant and that the modified proppant is capable to dissociate negatively and positively charged groups.

Figure 10:
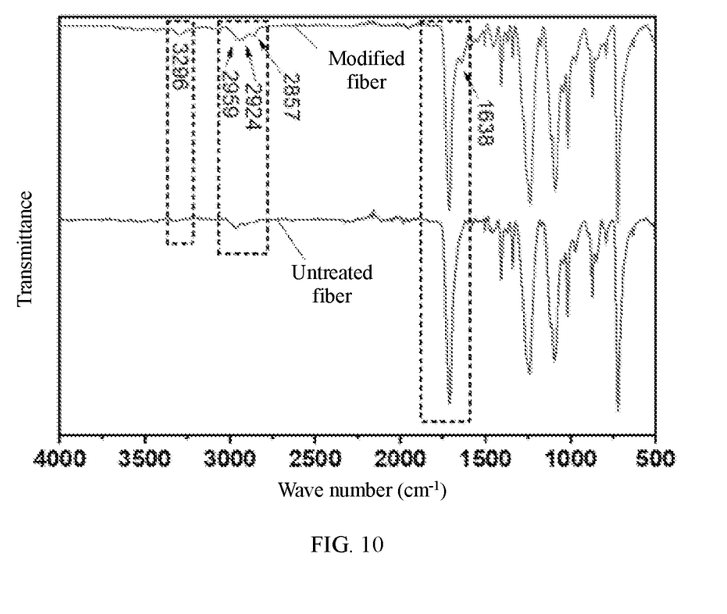
FIG. 10 is a schematic diagram of the ATR-FTIR. comparison between the modified fiber obtained in Embodiment 1 of the present invention and the untreated fiber.

The modified fibers in this embodiment are grafted with cationic polymers on their surface and when they come into contact with water or fracturing fluid, the grafted cationic polymers on their surface dissociate from the positively charged groups, resulting in a positively charged surface On the modified fibers. The modified fibers are characterized by ATR-FTIR and the results are shown in FIG. 10. It is clear from FIG. 10 that compared to the untreated fibers, the grafted fibers show new peaks at 3,296 $cm^{-1}$. The peak is significantly enhanced at 2,916 $cm^{-1}$ and 2,852 $cm^{-1}$, and a new peak appears at 1,638 $cm^{-1}$. From these results it can be inferred that the modified fiber snake are successfully grafted with: cationic polymers and results in a change in the surface properties of the fiber.

The reagent ratio for the artificial seawater in this embodiment is shown in Table 2.

TABLE 2

Reagent Ratio for the Artificial Seawater

| Name | Reagent name | Proportion, g/L |
|---|---|---|
| Artificial seawater | NaCl | 24.53 |
| | $MgCl_2$ | 5.2 |
| | $NaSO_4$ | 4.09 |
| | $CaCl_2$ | 1.16 |
| | KCl | 0.695 |
| | $NaHCO_3$ | 0.201 |
| | KBr | 0.101 |

Figure 1:
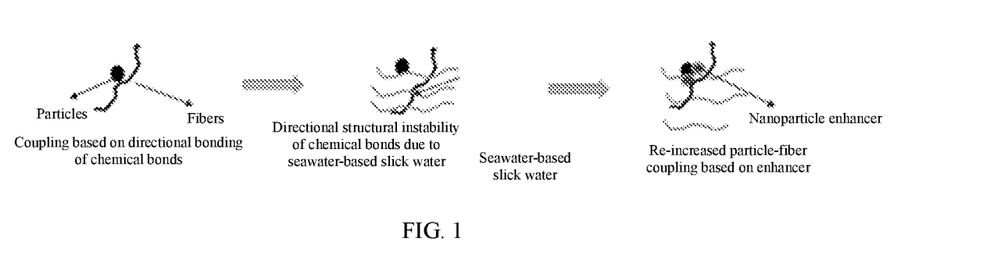
FIG. 1 is a principle diagram of the seawater-based enhanced fracturing fluid carrying the biomimetic, dandelion proppant in the present invention.
Figure 2:
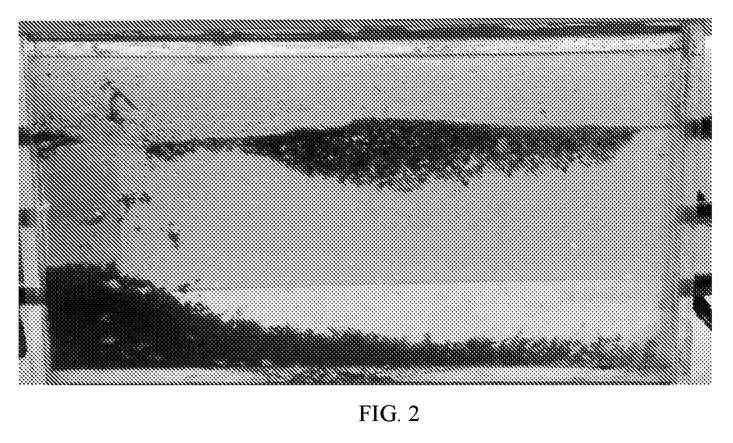
FIG. 2 is a schematic diagram of the proppant placement effect of the seawater-based enhanced fracturing fluid carrying the biomimetic dandelion proppant Embodiment 1 of the present invention.

The efficiency of the enhanced fracturing fluid carrying the biomimetic dandelion proppant obtained from this embodiment i s evaluated as follows, 1. Assemble and test the dynamic proppant-carrying evaluation device, add enhanced seawater-based fracturing fluid to the mixing barrel and start stirring;

2. Open the perforation channel and turn on the injection pump, inject 0.5 L of seawater-based fracturing fluid (prepad fluid), and then close the perforation channel;

3. Add the biomimetic dandelion proppant to the mixing barrel in the order of fiber first and then proppant, and open the perforation channel and the fracture outlet valve after the proppant is evenly mixed, and observe the experimental results. The dynamic experimental results of the enhanced seawater-based fracturing fluid carrying the biomimetic dandelion proppant are shown in FIG. 2.

Embodiment 2

The steps are as in Embodiment 1, except that 100 pbw of seawater-based fracturing fluid includes 0.1 pbw of polyacrylamide polymer, 0.01 pbw of alkyl glycoside nonionic surfactant, 0.2 pbw of ammonium chloride, 0.01 pbw of dodecyl dimethyl benzyl ammonium chloride, and artificial seawater.

Figure 3:
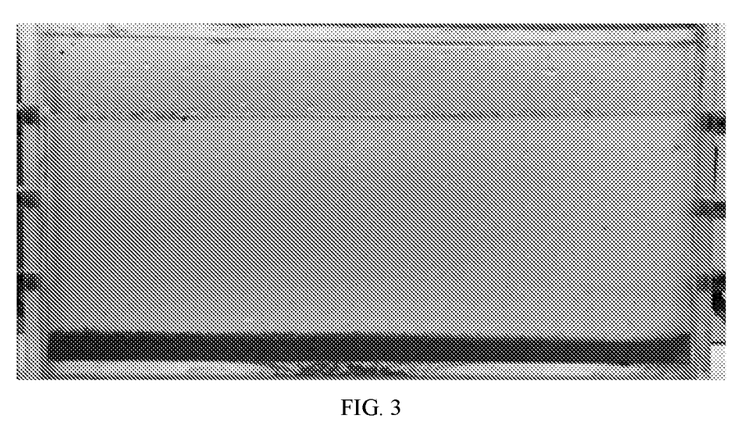
FIG. 3 is a schematic diagram of the proppant placement effect of the seawater-based enhanced fracturing fluid carrying the conventional ceramsite in Embodiment 2 of the present invention.

Equal amounts of conventional ceramsite proppant and polyvinyl alcohol fibers are weighed as in Embodiment 1, with a fiber length of 9 mm; the efficiency of proppant carrying is evaluated as in Embodiment 1, and the results are shown in FIG. 3.

Embodiment 3

Figure 4:
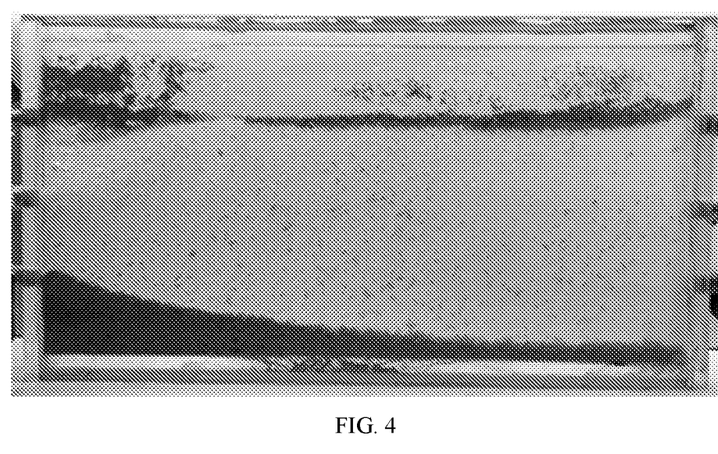
FIG. 4 is a schematic diagram of the proppant placement effect of the seawater-based enhanced fracturing fluid with medium viscosity carrying the biomimetic dandelion proppant in Embodiment 3 of the present invention.

The steps are as in Embodiment 1, except that the polyacrylamide polymer in the seawater-based fracturing fluid is adjusted to 1 pbw, the viscosity of the fracturing fluid is changed, and the rest remain unchanged. Dynamic experiment is conducted on the enhanced seawater-based fracturing fluid carrying the biomimetic dandelion proppant, with its results shown in FIG. 4.

Embodiment 4

Figure 5:
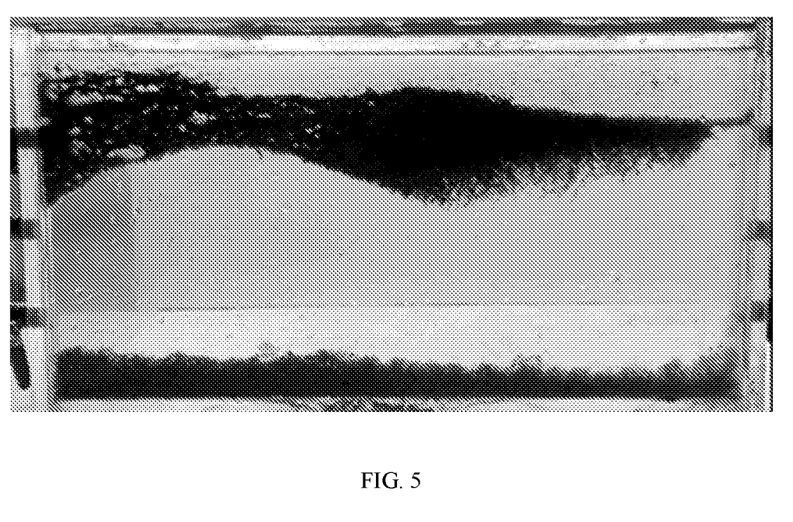
FIG. 5 is a schematic diagram of the proppant placement effect of the seawater-based enhanced fracturing fluid carrying the biomimetic dandelion proppant with a small particle size in Embodiment 4 of the present invention.

The steps are as in Embodiment 1, except that the particle size of the modified ceramsite is 70/140, that is, the particle size of the proppant is changed, and the rest remains unchanged. Dynamic experiment is conducted on the enhanced seawater-based fracturing fluid carrying the biomimetic dandelion proppant, with its results shown in FIG. 5.

The enhanced fracturing fluid, proppant and fibers treated in the present invention can interact to make the fibers and the proppant bond with each other, and the enhanced nanoparticle in the fracturing fluid can further enhance the bonding between fibers and proppant; the fibers arc etched on the surface by the acidic solution, while the ultrasonic oscillation makes the molecular chains in the fibers loosen and creep to limn pores, and the acidic solution can enter the pores and thither etch the surface of the fibers, and partially remain on the surface of the fibers; thus the roughness and specific surface area of the treated fiber surface are greatly increased; which is therefore more conducive to the interaction with the treated proppant and the fibers; moreover, as some polar bonds remain on the fiber, it is also conducive to the formation of chemical bonds, such as hydrogen bond, between the fiber and the treated proppant, thus further enhancing their interaction.

Figure 6:
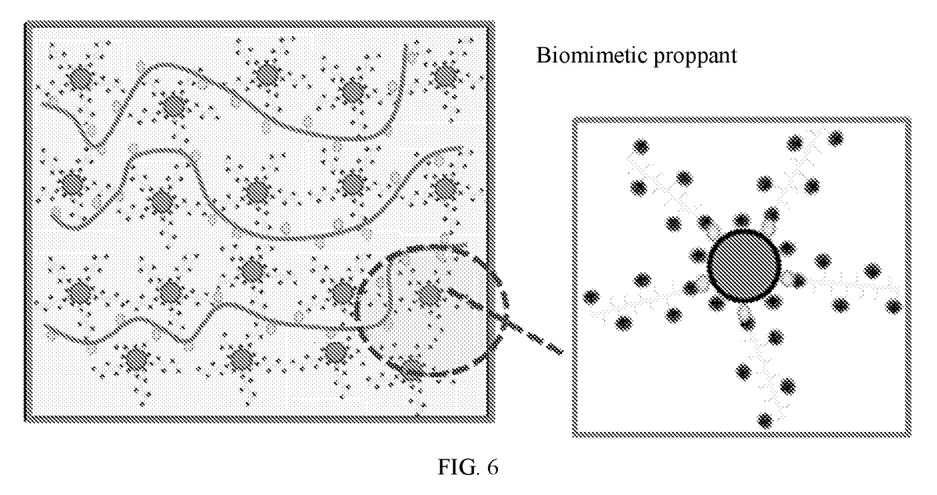
FIG. 6 is a schematic diagram of the grafting mode of the biomimetic proppant in the present invention.

The specific principle is shown in FIG. 6. The proppant covered with zwitterionic polymer is mixed with the fiber grafted with cationic polymer and the fracturing fluid with anionic polymer. There are three electrostatic attraction based on positive and negative charges in the solution at the same time, including the Coulomb force between the groups in the proppant and the groups in the fibers, the Coulomb force between the groups in the fracturing fluid and the groups in the fibers, and the Coulomb force between the groups in the proppant and the groups in the fracturing fluid. These three types of electrostatic attraction make it possible for any two of fiber, propellant and fracturing fluid to be mutually attracted to each other to establish a new coupling system. In addition, the existence of some polar bonds on the fibers also facilitates the formation of chemical bonds, such as hydrogen bond, between the fibers and the treated proppant, which further enhances their interaction, allowing the groups to be held tightly together and not affected by external physical or chemical factors, resulting in the grafting pattern shown in FIG. 6.

What is claimed is:

1. A bionics-based efficiently transported and packed proppant, comprising enhanced fracturing fluid and biomimetic dandelion proppant, wherein the mass ratio of the enhanced fracturing fluid and the biomimetic dandelion proppant is: 1-2:100-400;

The 100 pbw of enhanced fracturing fluid includes 0.1-1 pbw of drag reducing agent, 0.01-0.1 pbw of cleanup additive, 0.2-0.8 pbw of clay stabilizer, 0.01-0.05 pbw of bactericide, 0.01-0.2 pbw of nanoparticle enhancer, and water;

The biomimetic dandelion proppant consists of modified proppant and modified fiber, and the mass ratio between the modified proppant and the modified fiber is 99-99.9:0.1-1.

2. The bionics-based efficiently transported and packed proppant according to claim 1, wherein the nanoparticle enhancer is nanoparticle, which is modified as follows:

a modifier is sprayed on the surface of the nanoparticle, and then nanoparticle are kept at 50° C. for 20-30 min and dried at 105° C. to obtain the modified nanoparticle;

The nanoparticle are prepared with one, two or more of nanosilicon dioxide.

3. The bionics-based efficiently transported and packed proppant according to claim 2, wherein the modifier is prepared with one, two or more of cocamidopropyl hydroxysulfobetaine, and/or lauramidopropyl betaine.

4. The bionics-based efficiently transported and packed proppant according to claim 1, wherein the proppant is modified as follows:

Step 1-1: Clean the proppant, dry it at 105° C., and then cool down to room temperature;
Step 1-2: Sock the proppant prepared in Step 1-1 in a proppant treating agent at 50° C. for 10-30 min;
Step 1-3: Filter out the proppant, dry it at 50° C., heat it up to 105° C. for 10-30 min to obtain a modified proppant.

5. The bionics-based efficiently transported and packed proppant according to claim 1, wherein the fibers are modified as follows:

Step 2-1: Clean the fibers and dry them at 105° C.;
Step 2-2: Put the fibers prepared in Step 2-1 in an acidic solution with a temperature of 40-90° C., and soak and ultrasonically oscillate it for 30-40 min;
Step 2-3: Filter out the fibers and dry them at 105° C.;
Step 2-4: Soak the dried fibers in a solution of nitrogen-containing silane coupling agent for 5-10 min, filter them out and dry in the shade at 70-80° C. to obtain a modified fibers.

6. The bionics-based efficiently transported and packed proppant according to claim 4, wherein the proppant treating agent includes 70 pbw of organic solvent, 1-5 pbw of poly-methyltriethoxysilane, 1-20 pbw of silane coupling agent, 0.1-3 pbw of titanate, and 0.5 to 2 pbw of silicone resin.

7. The bionics-based efficiently transported and packed proppant according to claim 1, wherein the drag reducing agent is polyacrylamide polymer; the clay stabilizer is prepared with potassium chloride; the cleanup additive is alkyl glycoside nonionic surfactant; the bactericide is dodecyl dimethyl benzyl ammonium chloride; the water is seawater, freshwater, or no water is contained.

8. The bionics-based efficiently transported and packed proppant according to claim 6, wherein the proppant is prepared with quartz sand, with a particle size of 20-140 mesh; the organic solvent is prepared with one, two or more of alcohol; the silane coupling agent is N-(B-aminoethyl)-γ-aminopropytrimethoxysilane; the titanate is titanium tetrabutoxide.

9. The bionics-based efficiently transported and packed proppant according to claim 5, wherein the fibers are mineral fiber, with a length of 1-20 mm; the acidic solution is diluted hydrochloric acid; the silane coupling agent is N-(B-aminoethyl)-γ-aminopropytrimethoxysilane.

10. A preparation method for the bionics-based efficiently transported and packed proppant according to claim 1, wherein the proppant can be obtained by completely mixing the enhanced fracturing fluid and the biomimetic dandelion proppant in proportion to their weight.

\* \* \* \* \*